March 8, 1927.

W. F. BRISCOE

FLEXIBLE COUPLING

Filed June 22, 1926

1,620,592

WITNESSES

INVENTOR
WALTER F. BRISCOE
BY
ATTORNEYS

Patented Mar. 8, 1927.

1,620,592

UNITED STATES PATENT OFFICE.

WALTER F. BRISCOE, OF TRENTON, NEW JERSEY.

FLEXIBLE COUPLING.

Application filed June 22, 1926. Serial No. 117,817.

This invention relates to coupling devices and has particular reference to an improvement in flexible couplings for shafts, adapted for heavy duty or general use where the shafts to be coupled thereby are never more than slightly out of alinement.

One of the principal objects of the present invention is to provide a coupling between the driving and driven elements or shafts which is sufficiently elastic or flexible to allow for a limited disturbance in alinement of said elements or shafts either eccentric or angular without affecting the transmission of power therebetween, and which coupling is of such a nature as to subject the same to equal strain.

As a still further object the invention contemplates a coupling of the character set forth which allows for the removal of either element or shaft from its bearing without the necessity of axially displacing the same.

The invention furthermore aims to provide a flexible coupling which is operable either in a clockwise or contraclockwise direction, and in which either of the elements coupled thereby may be employed as the driven or driving member.

Other objects reside in the means of lubrication therefor, the means for enclosing the operating parts to protect the same from dust, dirt, or other foreign matter, and the enclosure of all projecting parts which would tend toward injury to persons coming in contact therewith.

The invention furthermore resides in the provision of a coupling of the character specified which is comparatively simple in its construction and mode of operation, inexpensive to produce and install, and which is thoroughly reliable and highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
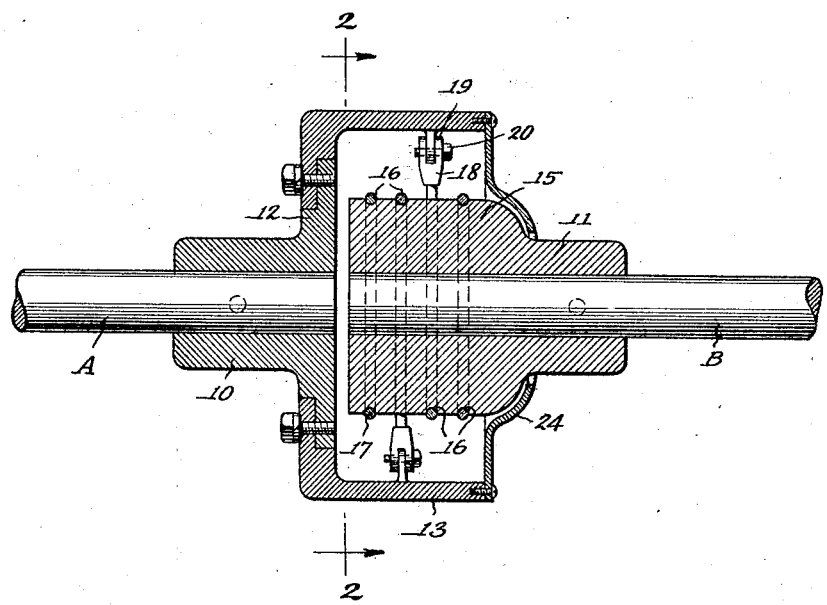
Figure 1 is a longitudinal sectional view through the coupling.
Figure 2:
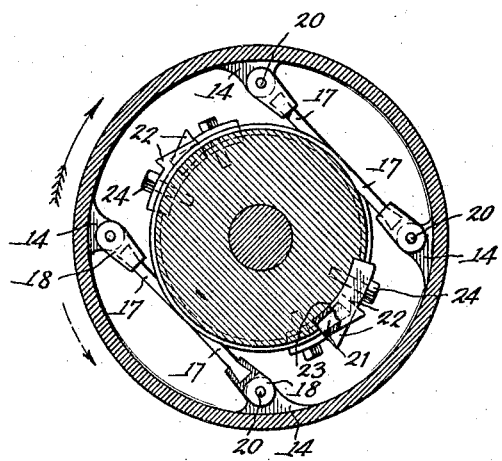
Fig. 2 is a transverse sectional view therethrough taken approximately on the line indicated at 2—2 in Fig. 1.

Referring to the drawings by characters of reference, A designates a driving shaft or element, and B a driven shaft or element, the arbor of which may be reversed if desired.

The coupling constituting the present invention includes a driving element 10 and a driven element 11, which are keyed or otherwise secured, respectively, to the shafts A and B for turning movement therewith. The driving member 10, which is in the nature of a hub or sleeve, is formed at one end with an annular flange 12, to which is bolted or otherwise secured a substantially cylindrical casing 13 having circumferentially spaced inwardly projecting apertured lugs 14 on its inner periphery for a purpose to be hereinafter set forth. The driven member 11, which is also in the nature of a hub or sleeve, has an enlarged inner end 15 positioned within the casing 13, the enlarged portion having a plurality of annular axially spaced peripheral grooves 16.

In order to establish a flexible driving connection between the driving and driven elements 10 and 11, a plurality of cables 17 are employed, one end of each of which has secured thereto a yoke or bifurcated terminal member 18, the furcations 19 of which are apertured to aline with the apertures in the lugs 14. The apertures in the lugs 14 may be equipped with bushings and bolts 20 are inserted through the alined apertures in the furcations 19 and the apertured lugs 14 for connecting the cable terminal members to the lugs. By way of illustration, it will be noted that four cables are employed, but it is obvious that two or more may be used within the scope of the invention. In any instance, an equal number of couplings are trained in opposite directions around the enlarged portion 15 of the driven element 11, and lie within the respective peripheral grooves 16. Preferably the cables are of a length to extend approximately three-quarters of the distance around the portion 15 where the end is positioned within the outwardly converging bore 21 of the anchoring devices 22 which are preferably inserted in milled openings 23 in the periphery of the portion 15 and bolted or otherwise secured in place, the end of the cable inserted in the tapering bore 21 being spread and molten metal poured into the strands to insure a tight connection. This form of connection is also established between the terminal members 18 and the outer ends of the cables.

As hereinbefore set forth, a like number of cables extend in opposite directions around the enlarged portion 15 of the driven element between the anchoring devices and the lugs so that turning of the shaft A in opposite directions will effect a pull on each set of cables for turning the shaft B in a corresponding direction. The cables are preferably of steel and are of such a length as to allow for a reasonable amount of back lash between the two members, thereby permitting of a limited variation in the alinement of the axes of the shafts A and B either eccentric or angular.

In order to house and protect the working parts from the free entrance of dust, dirt, or other foreign matter; to cover and eliminate exterior projecting fingers, studs or bolts, and to provide a chamber for a lubricant, the open end of the casing 13 has attached thereto an annular guard 24, which is centrally apertured to permit the reduced portion of the member 11 to project therethrough. The lubricant or oil placed within the casing will be automatically distributed to the parts to be lubricated by a splash system when the device is rotating, and when inactive the same will be prevented by the guard from leaking.

What is claimed is:

1. A flexible coupling, comprising concentrically disposed driving and driven members arranged one within the other, and flexible elements anchored to the inner periphery of the outer member and the outer periphery of the inner member and partially embracing the latter, the inner member having peripheral grooves within which the flexible elements are respectively received.

2. A flexible coupling, comprising concentrically disposed driving and driven members arranged one within the other, and flexible elements anchored to the inner periphery of the outer member and the outer periphery of the inner member and partially embracing the latter, the said flexible elements extending around the periphery of the inner member in clockwise and counterclockwise direction.

3. A flexible coupling for shafts, comprising a substantially cup-shaped member attached to the end of one shaft, a drum-like member attached to the end of the other shaft and disposed normally concentrically within the first member, and flexible elements anchored to the inner periphery of the first member and extending in clockwise and counterclockwise directions, wound upon the periphery of the second member and anchored thereto.

4. A flexible coupling for shafts, comprising a substantially cup-shaped member attached to the end of one shaft, a drum-like member attached to the end of the other shaft and disposed normally concentrically within the first member, flexible elements anchored to the inner periphery of the first member and extending in clockwise and counterclockwise directions, wound upon the periphery of the second member and anchored thereto, and an annular guard member secured to the open end of the cup-shaped member having a central opening through which the second member loosely extends, whereby to provide a cover for preventing the entrance of foreign matter and to afford a chamber for lubricant.

WALTER F. BRISCOE.